United States Patent

Joong et al.

[11] Patent Number: 6,101,398
[45] Date of Patent: Aug. 8, 2000

[54] SYSTEM SUPPORTING DATA/FAX CONNECTION WITH A DUAL MODE MOBILE TELEPHONE

[75] Inventors: Donald Joong, Montreal, Canada; Alan Sicher, Garland, Tex.

[73] Assignee: Telefonaktiebolaget LM Ericsson, Stockholm, Sweden

[21] Appl. No.: 09/139,931

[22] Filed: Aug. 26, 1998

[51] Int. Cl.[7] .................................................. H04B 1/38
[52] U.S. Cl. ...................... 455/557; 455/553; 379/88.13; 379/100.01
[58] Field of Search .................................. 455/553, 557, 455/556, 426, 550; 379/88.13, 93.01, 93.05, 93.06, 93.08, 93.09, 93.15, 93.14, 100.01, 100.17, 100.03, 100.05, 100.12; 370/331, 385, 352, 355, 389, 410, 474, 522; 375/216, 222

[56] References Cited

U.S. PATENT DOCUMENTS

| | | |
|---|---|---|
| 5,479,480 | 12/1995 | Scott . |
| 5,537,458 | 7/1996 | Suomi et al. . |
| 5,845,210 | 12/1998 | Moon ....................................... 455/426 |
| 5,850,391 | 12/1998 | Essigmann ............................... 370/331 |
| 5,878,078 | 3/1999 | Griffin et al. ............................ 375/222 |
| 5,920,825 | 7/1999 | Patel et al. ............................... 455/557 |
| 5,930,727 | 7/1999 | Henry, Jr. ................................ 455/557 |

FOREIGN PATENT DOCUMENTS

| | | |
|---|---|---|
| 0 661 893 | 7/1995 | European Pat. Off. . |
| 2 274 960 | 8/1994 | United Kingdom . |
| 2 289 555 | 11/1995 | United Kingdom . |
| WO 92/10047 | 6/1992 | WIPO . |
| WO 95/34958 | 12/1995 | WIPO . |
| WO 96/35286 | 11/1996 | WIPO . |
| WO 98/15106 | 4/1998 | WIPO . |

OTHER PUBLICATIONS

PCT International Search Report, Jan. 14, 2000, PCT/SE 99/01345.

*Primary Examiner*—Dwayne D. Bost
*Assistant Examiner*—Tracy M. Legree
*Attorney, Agent, or Firm*—Jenkens & Gilchrist, P.C.

[57] ABSTRACT

An interface between a dual mode mobile station and a piece of data terminal equipment supports both a logical digital interface and a logical analog interface, with the analog interface passing through a modem. At set-up of either a mobile originated or mobile terminated data/fax call, a supporting dual mode communications network determines whether a digital traffic channel is available on an air interface. If so, the channel is allocated to the mobile station, and data/fax communication with the data terminal equipment occurs using the logical digital interface. Otherwise, an analog voice channel is allocated, and the data/fax communication with the data terminal equipment occurs using the logical analog interface and modem. Within the supporting network, data/fax communications via the digital traffic channel are routed through an interworking functionality that terminates a radio link protocol utilized for communicating over the digital air interface. Analog voice channel data/fax communications are instead routed through a modem pool that terminates a selected modem protocol utilized by the modem for communicating over the analog air interface.

15 Claims, 2 Drawing Sheets

SYSTEM SUPPORTING DATA/FAX CONNECTION WITH A DUAL MODE MOBILE TELEPHONE

BACKGROUND OF THE INVENTION

1. Technical Field of the Invention

The present invention relates to mobile communications systems and, in particular, to the establishment of data/fax communications connections with a dual mode (analog/digital) mobile telephone.

2. Description of Related Art

Reference is now made to FIG. 1 wherein there is shown a block diagram illustrating a prior art system connection between an analog mobile telephone 10 and a supporting telecommunications network 12 to handle data/fax calls. Such data/fax calls are either originated at, or terminated to, a first piece of data terminal equipment 14(1) (such as a personal computer or a facsimile machine) connected to the analog mobile-telephone 10. At the other end of such an established data/fax call connection through the supporting telecommunications network 12 is a second piece of data terminal equipment 14(2) (also comprising, for example, a personal computer or a facsimile machine) that is connected to either another mobile telephone (not shown) or to land telephone line (also not explicitly shown). The supporting telecommunications network 12 in this instance comprises at least the public land mobile network (analog PLMN, such as an advanced mobile phone service (AMPS) system like that defined by the US EIA/TIA-553 standard) servicing the analog mobile telephone 10 and, where necessary, the network 12 further includes the public switched telephone network (PSTN).

The analog mobile telephone 10 is connected to the first piece of data terminal equipment 14(1) using an analog interface 16. Both the first and second pieces of data terminal equipment 14 include an integrated modem 18 for converting between a serial digital bit stream (compatible with the operation of the data terminal equipment) and an analog signal. This conversion is made through the implementation of standard, conventional PSTN modem protocols (such as V.34). This analog signal is of the type suitable for handling by either the analog mobile telephone 10 or a land line type PSTN 12 connection (not shown).

The communications connection between the analog mobile telephone 10 and the supporting PLMN 12 is effectuated over a cellular analog air interface 20 well known in the art. More particularly, the data/fax call itself is carried by an analog voice channel (AVC) 22 supported by the air interface 20.

Operation of the system connection illustrated in FIG. 1 is as follows. For data/fax information originated at the first piece of data terminal equipment 14(1), the generated serial digital bit stream is converted to the analog signal by the modem 18 using conventional PSTN modem protocols. The analog signal is then communicated by the analog mobile station 10 over the air interface on a selected analog voice channel. The supporting PLMN/PSTN 12 receives the transmitted analog signal, and routes the analog signal towards the destination second piece of data terminal equipment 14(2). A modem 18 within that second piece of data terminal equipment 14(2) then converts the analog signal to a serial digital bit stream for further processing. A reverse process is implemented for the communication of data/fax information originated at the second piece of data terminal equipment 14(2). In each case, an end-to-end connection through the supporting PLMN/PSTN 12 is established prior to any data/fax communication.

The reliability and robustness of data/fax calls carried over air interface 20 analog voice channels 22 using conventional PSTN modem protocols leaves much to be desired. A number of new enhanced analog data protocols (such as, for example, MNP10, ETC, TX-CEL, and the like cellular modem protocols) recently have been developed which significantly improve data throughput and reliability on analog voice channels. In order to take advantage of these enhanced two-sided protocols in the communications environment of FIG. 1, end-to-end support of the protocols must be available. Thus, each of the modems 18, rather than supporting only conventional PSTN modem protocols, must be able to support the enhanced protocols. Alternatively, as illustrated in FIG. 1, where the modem 18 connected to the second piece of data terminal equipment 14(2) supports only standard-PSTN modem protocols, the supporting PLMN/PSTN includes a configuration whereby a modem pool (MP) 24 is deployed within the network 12 to terminate the enhanced protocols utilized to facilitate analog air interface 20 (analog voice channel 22) data/fax communication, and provide an interworking towards the far end data terminal equipment 14(2) using the conventional PSTN modem protocols supported by its modem 18.

Operation of the system connection illustrated in FIG. 2 is as follows. For data/fax information originated at the first piece of data terminal equipment 14(1), the generated serial digital bit stream is converted to the analog signal by the modem 18 using one of the enhanced modem protocols. The analog signal is then communicated by the analog mobile station 10 over the air interface on a selected analog voice channel. The supporting PLMN/PSTN 12 receives the transmitted analog signal, and routes the analog signal towards the modem pool 24. Processing of the analog signal to terminate the enhanced modem protocols and apply the conventional PSTN modem protocols is then performed by the modem pool 24. The resulting signal is then routed through the network 12 to a destination second piece-of data terminal equipment (not shown, see, FIG. 1). The modem (not shown, see, FIG. 1) associated with that second piece of data terminal equipment then converts the analog signal to a serial digital bit stream for further processing. For these mobile originated calls, a special dialing procedure may be required in order to invoke the modem protocol conversion (i.e., interworking) functionality provided by modem pool 24. A reverse process is implemented for data/fax information originated at the second piece of data terminal equipment. However, for such mobile terminated calls, modem pool 24 configurations are not easily supported, and effective communication may be limited to a system connection providing end-to-end connectivity using only a selected one of the enhanced protocols.

Reference is now made to FIG. 3 wherein there is shown a block diagram illustrating a prior art system connection between a digital mobile telephone 40 and a supporting telecommunications network 42 to handle data/fax calls. Such data/fax calls are either originated at, or terminated to a first piece of data terminal equipment 44(1) (such as a personal computer or a facsimile machine) connected to the digital mobile telephone 40. At the other end of such a call connection through the supporting telecommunications network 42 is a second piece of data terminal equipment 44(2) (also comprising, for example, a personal computer or a facsimile machine) that is connected to either another mobile telephone (not shown) or to a land telephone line (also not explicitly shown). The supporting telecommunications network 42 in this instance comprises at least the public land mobile network (digital PLMN, such as a D-AMPS system like that defined by Interim Standard IS-54B/IS-136A) servicing the digital mobile telephone 40 and, where necessary, the network 42 further includes the public switched telephone network (PSTN).

The digital mobile telephone 40 is connected to the first piece of data terminal equipment 44(1) using a digital interface 46. In the event the second piece of data terminal equipment 44(2) utilizes a wireless or wireline analog connection to the supporting network 42, an integrated modem 48 is included for converting between a serial digital bit stream (compatible with the operation of the data terminal equipment) and an analog signal through the implementation of standard, conventional PSTN modem protocols. This analog signal is of the type suitable for handling by either the analog mobile telephone 10 (see, FIG. 1) or a land line type PSTN 42 connection (not shown).

The communications connection between the digital mobile telephone 40 and the supporting PLMN 42 is effectuated over a cellular digital air interface 50 well known in the art (such as the Interim Standard IS-136 interface). More particularly, the data/fax call itself is carried by a digital traffic channel (DTC) 52 supported by the air interface 50. The D-AMPS portion of the network 42 supports an Asynchronous Data and Group 3 Fax (ADS/G3Fax) service capability which allows mobile subscribers to originate or terminate modem based data calls using these digital traffic channels 52. For data/fax calls, the conventional PSTN modem protocol utilizes phase shift keyed (PSK) tones to transmit information. These tones are not suitable for processing by the vocoder (not shown) within the digital mobile station 40. A digital radio link protocol (RLP, such as the Interim Standard IS-130 protocol) is provided over the air interface 50 to obviate the need for a modem and support serial digital bit stream communication with the first piece of data terminal equipment 44(1) using the digital traffic channel 52. Furthermore, the supporting PLMN/PSTN 42 includes an interworking functionality (IWF) 56 operable to terminate the radio link protocol utilized for the air interface 50 connection and support interworking with the far end data terminal equipment 44(2) using the conventional PSTN modem protocols (or perhaps other enhanced modem protocols) supported by its modem 48. Appropriate use of the Interim Standard IS-737 protocols (providing network ANSI 41 message support) is also made.

Operation of the system connection illustrated in FIG. 3 is as follows. For data/fax information originated at the first piece of data terminal equipment 44(1), the generated serial digital bit stream is transmitted to the digital mobile station 40 and communicated over the air interface 50 on a selected digital traffic channel 52. In this implementation, the information bypasses the vocoder (not shown) of the digital mobile station 50, and the appropriate radio link protocol is applied to support the call. The supporting PLMN/PSTN 52 receives the transmitted digital signal, and routes the digital signal towards the —interworking function 56. Processing of the digital signal in order to terminate the applied radio link protocol and apply the conventional PSTN modem protocols (or perhaps other enhanced modem protocols) supported by the modem 48 for the far end data terminal equipment 44(2). The signal is then routed to that far end piece of data terminal equipment 44(2) through the network 42. The modem 48 then converts the received signal to a serial digital bit stream for further processing by the data terminal equipment 44(2). A reverse process is implemented for data/fax information originated at the second piece of data terminal equipment.

SUMMARY OF THE INVENTION

At set-up of either a mobile originated or mobile terminated data/fax call, a supporting dual mode communications network determines whether a digital traffic channel is available on an air interface. If so, the digital channel is allocated to the mobile station, and data/fax communication with a piece of data terminal equipment occurs over that channel and through a digital logical interface established between the mobile station and the equipment. Within the supporting network, the data/fax communication carried by the digital traffic channel is routed through an interworking functionality that terminates a radio link protocol utilized for communicating over the digital air interface. If no digital channels are available, an analog voice channel is allocated, and the data/fax communication with the data terminal equipment occurs over that channel and through a logical analog interface and modem. The data/fax communication carried by the analog voice channel is routed through a modem pool that terminates a selected modem protocol utilized by the modem for communicating over the analog air interface.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 4:
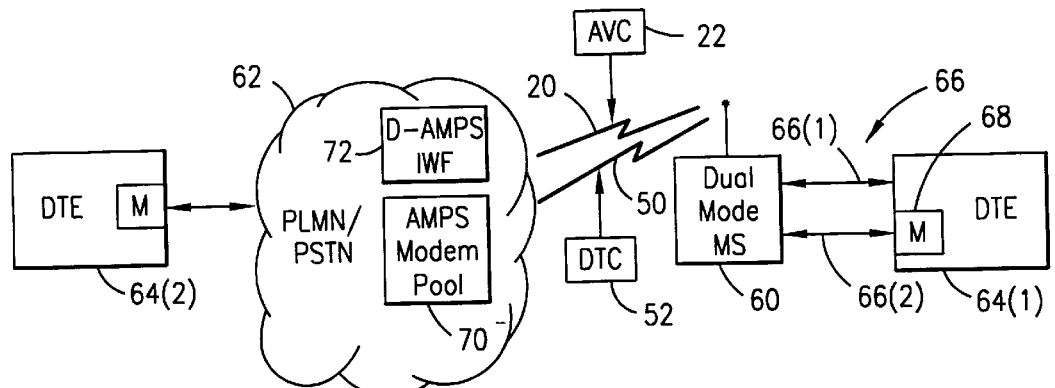
FIG. 4 is a block diagram illustrating a system connection in accordance with the present invention between a dual mode (analog/digital) mobile telephone and a supporting telecommunications network to handle data/fax calls.

Reference is now made to FIG. 4 wherein there is shown a block diagram illustrating a system connection in accordance with the present invention between a dual mode (analog/digital) mobile telephone 60 and a supporting telecommunications network 62 to handle data/fax calls. Such data/fax calls are either originated at, or terminated to the dual mode mobile telephone 60 connected to a first piece of data terminal equipment 64(1) (such as a personal computer or a facsimile machine). At the other end of such a call connection handled through the supporting telecommunications network 62 is a second piece of data terminal equipment 64(2) (also comprising, for example, a personal computer or a facsimile machine) that is connected to either another mobile telephone (not shown) or to a land telephone line (also not explicitly shown). The supporting telecommunications network 62 in this instance comprises at least the public land mobile network (dual mode PLMN, such as a dual mode AMPS/D-AMPS system as defined by Interim Standard IS-54B/IS-136A) servicing the dual mode mobile telephone 60 and, where necessary, the network 62 further includes the public switched telephone network (PSTN).

Figure 1:
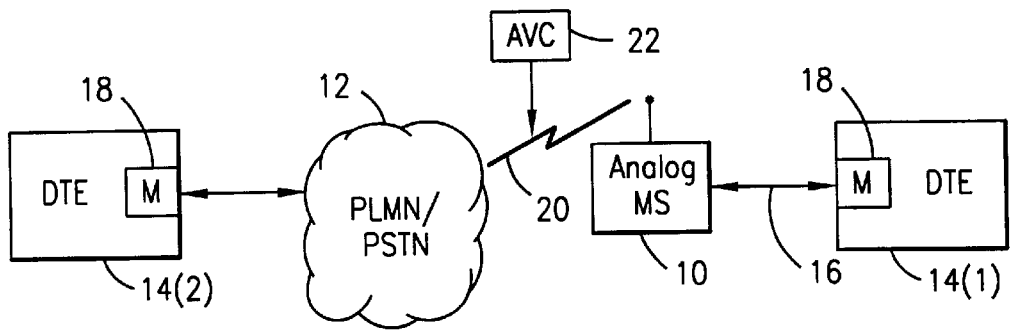
FIGS. 1 and 2, previously described, are block diagrams illustrating prior art system connections between an analog mobile telephone and a supporting telecommunications network to handle data/fax calls.
Figure 2:
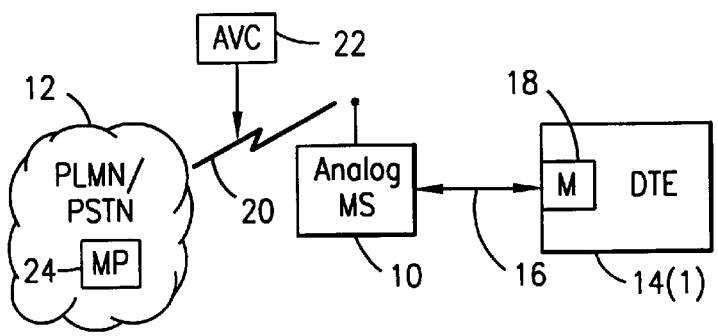
Figure 3:
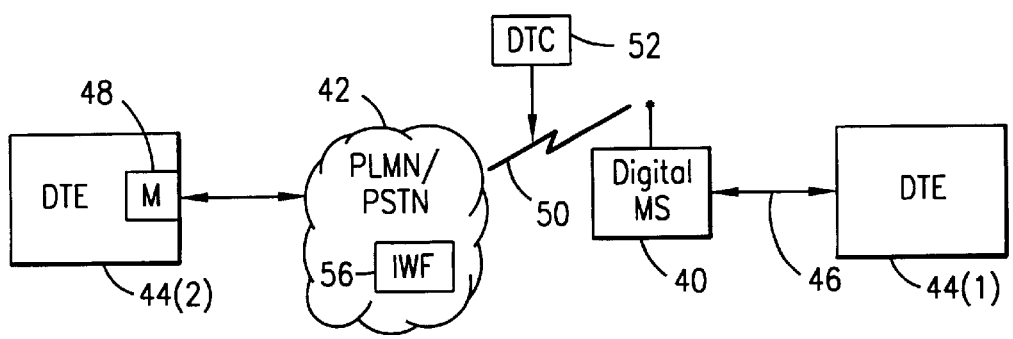
FIG. 3, previously described, is a block diagram illustrating a prior art system connection between a digital mobile telephone and a supporting telecommunications network to handle data/fax calls.

The dual mode mobile telephone 60 is connected to the first piece of data terminal equipment 64(1) using a dual interface 66. A first logical component of the dual interface comprises a direct digital serial interface 66(1) between the mobile station 60 mobile termination (such as MT2) and the data terminal equipment 64(1). This interface is used to communicate digital data/fax call information, and does not implicate use of a modem. A second logical component of the dual interface comprises an analog interface 66(2) between the mobile station 60 and a modem 68. This interface is used to communicate analog data/fax call information. In the event the second piece of data terminal equipment 44(2) makes a wireless or wireline analog connection to the supporting network 62, an integrated modem 68 is included for converting between a serial digital bit stream (compatible with the operation of the data terminal equipment) and an analog signal through the implementation of a selected one of a plurality of enhanced modem protocols. This analog signal is of the type suitable for handling by either the analog mobile telephone 10 (see, FIG. 1) or a land line type PSTN 12 connection (not shown).

The communications connection between the dual mode mobile telephone 60 and the supporting PLMN 62 is effectuated over a cellular analog air interface 20 for an analog data/fax call, and over a cellular digital air interface 50 for a digital data/fax call. More particularly, the analog data/fax call itself is carried by an analog voice channel (AVC) 22 supported by the air interface 20, and the digital data/fax call itself is carried by a digital traffic channel (DTC) 52 supported by the air interface 50 using an Asynchronous Data and Group 3 Fax (ADS/G3Fax) service capability. The supporting PLMN/PSTN 62 includes an AMPS modem pool 70 operable to terminate any enhanced modem protocols utilized for the analog air interface 20 connection and support interworking towards the second data terminal equipment 64(2) using conventional PSTN modem protocols (or perhaps other enhanced modem protocols) supported by its modem 68. The supporting PLMN/PSTN 62 further includes a D-AMPS interworking (IWF) functionality 72 operable to terminate the radio link protocol utilized for the digital air interface 50 connection and support interworking towards the second data terminal equipment 64(2) using the conventional PSTN modem protocols (or perhaps other enhanced modem protocols) supported by its modem 68.

Figure 5:
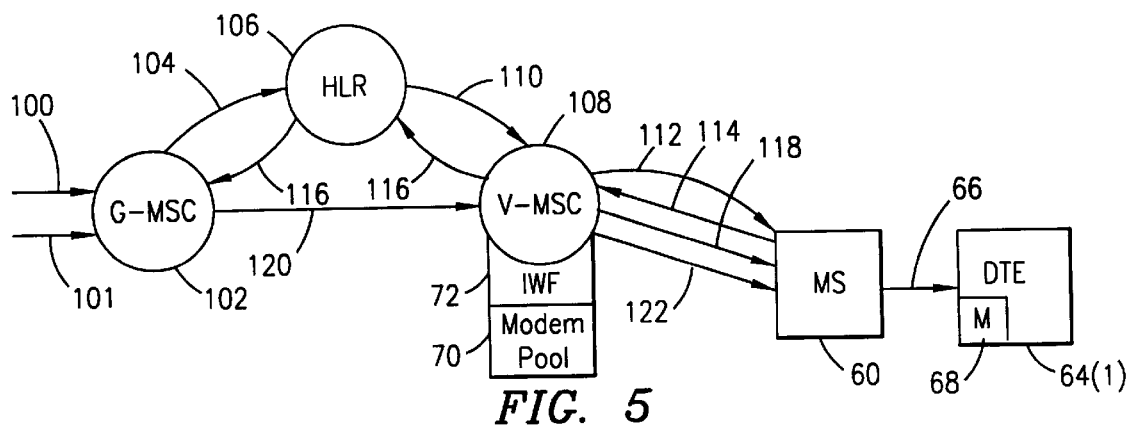
FIG. 5 is a signaling diagram for the set-up of mobile terminated data/fax calls in the system of FIG. 4.

Reference is now made to FIG. 5 wherein there is shown a signaling diagram for the set-up of mobile terminated data/fax calls in the system of FIG. 4. In order to place a data/fax call to the dual mode mobile station 60, a first call 100 is dialed to a gateway mobile switching center (G-MSC) 102. This first call signifies that the call comprises a data/fax call rather than a conventional voice call. Responsive to the first call 100, the gateway mobile switching center prompts the caller with another dial tone, and a second call 101 is initiated. This second call provides the directory number (B-number) of the mobile station 60 to which the data/fax call is to be directed. The gateway mobile switching center 102 then interrogates a home location register 106 with a location request (send routing) message 104 (which includes a service code identifying the call as a data/fax call). The location request (send routing) message 104 is processed by the home location register 106 to determine a visited mobile switching center (V-MSC) 108 currently believed to be serving the called mobile station 60. The home location register 106 then signals the serving visited mobile switching center 108 for the called mobile station 60 with a routing request (provide roaming) message 110 (which includes a service code identifying the call as a data/fax call) to prepare for the call.

The serving visited mobile switching center 108 then determines a location of the called mobile station 60. This location may be identified, for example, based on information resulting from a most recent registration (not shown) of the called mobile station 60. Preferably, the serving visited mobile switching center 108 determines location by paging 112 for the called mobile station 60. This paging message 112 includes a service code identifying for the mobile station 60 the fact that the incoming call comprises a data/fax call. Any received page acknowledgment 114 is then processed by the serving visited mobile switching center 108 to make a more precise location determination. In accordance with this determined location, the serving visited mobile switching center 108 selects an appropriate routing number (for example, a temporary location directory number (TLDN) or a roaming number) for that location. In this instance, the routing number is selected from a plurality of such numbers associated with the serving visited mobile switching center 108. The selected routing number is then returned 116 to the gateway mobile switching center 102 via the home location register 106.

In the meantime, the visited mobile switching center 108 selects a voice channel for the data/fax call. In this dual mode environment, voice channel preference is made for the selection of a digital traffic channel. If a digital traffic channel over the air interface is available, the visited mobile switching center 108 sends a digital channel assignment message 118 to the mobile station 60, recognizes from the received service code that the call comprises a data/fax call, and seizes the interworking function 72. The incoming call is then delivered (through connected) 120 using the routing number to the serving visited mobile switching center 108. When the through connected 120 call is received by the visited mobile switching center 108, it is routed through the interworking function 72 and sent 122 over the selected digital traffic channel for delivery to the mobile station 60. The interworking function 72 terminates the radio link protocol utilized for the digital air interface connection and supports interworking with the data terminal equipment (not shown) at the originating (i.e., calling party) end of the data/fax call connection using the conventional PSTN modem protocols (or perhaps other enhanced modem protocols). The information communicated in the data/fax call is then passed on to the data terminal equipment 64(1) over the digital interface portion of the dual interface 66.

If, on the other hand, only an analog voice channel over the air interface is available, the visited mobile switching center 108 sends an analog channel assignment message 118 to the mobile station 60, recognizes from the received service code that the call comprises a data/fax call, and seizes a resource from the modem pool 70. When the through connected 120 call is received by the visited mobile switching center 108, it is routed through the modem pool 70 and sent 122 over the selected analog voice channel for delivery to the mobile station 60. The modem pool 70 terminates any enhanced protocols utilized for the analog air interface connection and supports interworking with the data terminal equipment (not shown) at the originating (i.e., calling party) end of the data/fax call connection using the conventional PSTN modem protocols (or perhaps other enhanced modem protocols). The information communicated in the data/fax call is then passed on to the data terminal equipment 64(1) over the analog interface portion of the dual interface 66 and through the modem 68. Appropriate signals, if necessary, are generated by the mobile station 60 for delivery to the modem 68 to activate the modem process.

Figure 6:
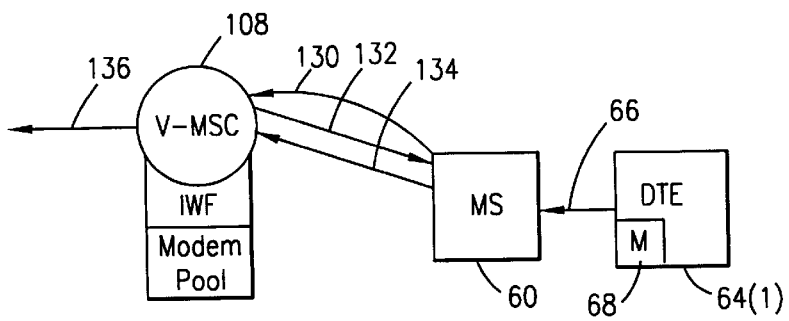
FIG. 6 is a signaling diagram for the set-up of mobile originated data/fax calls in the system of FIG. 4.

Reference is now made to FIG. 6 wherein there is shown a signaling diagram for the set-up of mobile originated data/fax calls in the system of FIG. 4. The mobile station 60 sends a call origination message 130 to its serving visited mobile switching center 108. This call origination message 130 includes a service code identifying for the visited mobile switching center 108 the fact that the originated call comprises a data/fax call. Also included in the message 130 is the directory number (B-number) for the called party.

The visited mobile switching center 108 responds to the call origination by selecting a voice channel to carry the mobile originated data/fax call. In this dual mode environment, voice channel preference is made for the selection of a digital traffic channel. If a digital traffic channel over the air interface is available, the visited mobile switching center 108 sends a digital channel assignment message 132 to the mobile station 60, recognizes from the received service code that the call comprises a data/fax call, and seizes the interworking function 72. The information to be communicated in the data/fax call is then passed from the data terminal equipment 64(1) over the digital interface portion of the dual interface 66 to the mobile station 60. The information is then sent 134 over the digital traffic channel to the visited mobile switching center 108, where it is routed through the interworking function 72 and through connected 136 over the network for delivery to the called party associated with the dialed B-number. The interworking function 72 terminates the radio link protocol utilized for the digital air interface connection and supports interworking with the data terminal equipment (not shown) at the terminating (i.e., called party) end of the data/fax call connection using the conventional PSTN modem protocols (or perhaps other enhanced modem protocols).

If, on the other hand, only an analog voice channel over the air interface is available, the visited mobile switching center 108 sends an analog channel assignment message 132 to the mobile station 60, recognizes from the received service code that the call comprises a data/fax call, and seizes a resource from the modem pool 70. The information to be communicated in the data/fax call is then passed from modem 68 of the data terminal equipment 64(1) over the analog interface portion of the dual interface 66 to the mobile station 60. The information is then sent 134 over the analog traffic channel to the visited mobile switching center 108, where it is routed through the modem pool 70 and through connected 136 over the network for delivery to the called party. The modem pool 70 terminates any enhanced protocols utilized for the analog air interface connection and supports interworking with the data terminal equipment (not shown) at the terminating (i.e., called party) end of the data/fax call connection using the conventional PSTN modem protocols (or perhaps other enhanced modem protocols). Appropriate signals, if necessary, are generated by the mobile station 60 for delivery to the modem 68 to activate the modem process.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A mobile communications system, comprising:
   a dual mode analog/digital-mobile telephone supporting a digital traffic channel radio link protocol for data/fax communication;
   a dual mode interface for interconnecting a piece of data terminal equipment and the dual mode analog/digital mobile telephone, the dual mode interface including a logical analog interface and a logical digital interface, wherein the logical analog interface supports a modem implementing an enhanced analog voice channel cellular modem protocol for data/fax communication;
   a mobile communications network supporting set-up of a mobile communication with the dual mode analog/digital mobile telephone over an analog air interface including at least one analog voice channel and a digital air interface including at least one digital traffic channel;
   a modem pool within the mobile communications network operable to terminate the enhanced analog voice channel cellular modem protocol;
   an interworking function within the mobile communications network operable to terminate the digital traffic channel radio link protocol; and
   means within the mobile communications network responsive to the mobile communications set-up of a data/fax call to or from the dual mode analog/digital mobile telephone for seizing the modem pool for that set-up call if the data/fax call is carried over an analog voice channel of the analog air interface and for seizing the interworking function for that set-up call if the data/fax call is carried over a digital traffic channel of the digital air interface.

2. The system as in claim 1 wherein the means for seizing comprises a mobile switching center of the mobile communications network.

3. The system as in claim 1 wherein the data/fax call connects the dual mode analog/digital mobile telephone to a far end piece of data terminal equipment through a modem implementing a certain modem protocol, and the modem pool further supporting interworking towards the far end piece of data terminal equipment using that certain modem protocol.

4. The system as in claim 3 wherein the certain modem protocol comprises a standard public switched telephone network modem protocol.

5. The system as in claim 1 wherein the data/fax call connects the dual mode analog/digital mobile telephone to a far end piece of data terminal equipment through a modem implementing a certain modem protocol, and the interworking function further supporting interworking towards the far end piece of data terminal equipment using that certain modem protocol.

6. The system as in claim 5 wherein the certain modem protocol comprises a standard public switched telephone network modem protocol.

7. A mobile communications network, comprising:
   a dual mode analog/digital air interface comprising an analog air interface including at least one analog voice channel and a digital air interface including at least one digital traffic channel;
   a modem pool operable to terminate an enhanced analog voice channel cellular modem protocol;
   an interworking function operable to terminate a digital traffic channel radio link protocol; and
   a mobile switching center for supporting a set-up of a data/fax call to or from a mobile station over the dual mode analog/digital air interface, the mobile switching center operating at the time of call set-up to seize the modem pool in connection with handling the set-up data/fax call if the data/fax call is carried over an analog voice channel of the analog air interface and seize the interworking function in connection with handling the set-up data/fax call if the data/fax call is carried over a digital traffic channel of the digital air interface.

8. The network as in claim 7 wherein the data/fax call is with a far end piece of data terminal equipment through a modem implementing a certain modem protocol, and the modem pool further supporting interworking towards the far end piece of data terminal equipment using that certain modem protocol.

9. The network as in claim 7 wherein the data/fax call is with a far end piece of data terminal equipment through a modem implementing a certain modem protocol, and the interworking function further supporting interworking towards the far end piece of data terminal equipment using that certain modem protocol.

10. The network as in claim 7 wherein the data/fax call is with a far end piece of data terminal equipment through a modem implementing a certain modem protocol, and wherein the call set-up for a mobile station terminated data/fax call utilizes a two-stage dialing procedure.

11. The network as in claim 10 wherein the mobile switching center further pages for the mobile station in connection with the mobile terminated data/fax call, that paging including a service code to indicate data/fax calling.

12. The network as in claim 7 wherein the data/fax call is with a far end piece of data terminal equipment through a modem implementing a certain modem protocol, and wherein the call set-up for a mobile station originated data/fax call utilizes a mobile station specified service code to indicate data/fax calling.

13. A method for dual mode analog/digital mobile communications network operation in connection with the handling of a mobile station originated or terminated data/fax call, comprising the steps of:

seizing a modem pool in connection with an initial set-up of the data/fax call if the data/fax call is carried over an analog voice channel of an analog air interface, wherein step of seizing includes the step of terminating an enhanced analog voice channel cellular modem protocol utilized in communicating data/fax call information over the analog voice channel; and seizing an interworking function in connection with an initial set-up of the data/fax call if the data/fax call is carried over a digital traffic channel of a digital air interface, wherein the step of seizing includes the step of terminating a digital traffic channel radio link protocol utilized in communicating data/fax call information over the digital traffic channel.

14. The method as in claim 13 wherein the data/fax call is with a far end piece of data terminal equipment through a modem implementing a-certain modem protocol, and the step of seizing the modem pool further includes the step of supporting interworking towards the far end piece of data terminal equipment using that certain modem protocol.

15. The method as in claim 13 wherein the data/fax call is with a far end piece of data terminal equipment through a modem implementing a certain modem protocol, and the step of seizing the interworking function further includes the step of supporting interworking towards the far end piece of data terminal equipment using that certain modem protocol.

* * * * *